May 26, 1970     W. C. SEVERIN     3,513,705

METHOD AND MEANS FOR INDICATING ULTRAHIGH TEMPERATURES

Filed July 29, 1968

INVENTOR.
WALTER C. SEVERIN
BY Harry A. Herbert Jr
and William F. O'Brien
ATTORNEYS

United States Patent Office 3,513,705
Patented May 26, 1970

3,513,705
METHOD AND MEANS FOR INDICATING ULTRAHIGH TEMPERATURES
Walter C. Severin, Lancaster, Calif., assignor to the United States of America as represented by the Secretary of the Air Force
Filed July 29, 1968, Ser. No. 748,519
Int. Cl. G01k 11/08
U.S. Cl. 73—358                                   1 Claim

ABSTRACT OF THE DISCLOSURE

A system for the accurate measurement of the ultrahigh temperatures which occur in ablative type materials during rocket motor firings. The system involves the concept of implanting very small temperature sensors into the ablative material in which temperature measurement is desired. The temperature sensors are composed of precalibrated eutectic mixtures of refractory metals and carbon encapsulated within a graphite container.

BACKGROUND OF THE INVENTION

This invention relates to a system for measuring ultrahigh temperatures within the range of 3500° F. to 6000° F. and to a high temperature sensor capable of detecting such temperatures. More particularly, this invention concerns itself with a method and a means for determining char temperature profiles occurring in rocket nozzle ablative liners during rocket motor firings.

In attempting to develop systems for determining the very high internal temperatures which take place in ablative type materials during rocket motor firings, the emphasis has been directed toward the development of improved thermocouple instruments. Such instruments have been used most widely as temperature sensors because of their relative simplicity of construction and availability. In addition, recent research efforts have achieved considerable progress in developing thermocouples capable of measuring high temperatures. For example, tungsten-rhenium alloy thermocouples are most widely used for accurate temperature measurements in the range of about 4200° F. However, such temperatures are still considerably lower than the ultrahigh temperatures occurring during rocket motor firings. Also, thermocouple instrumentation suffers other disadvantages in that they are susceptible to thermocouple breakage due to insulation failure and encounter calibration problems. Heat conduction away from the junction of the thermocouple wires and poor response time are additional problems encountered in the use of thermocouple instruments.

In attempting to overcome the problems found to exist with the use of thermocouple instruments, it has been found that the present invention makes it practically feasible to measure accurately temperatures in the range of 3500° F. to 6000° F. and to determine internal char temperature profiles for ablative plastic materials subjected to the ultrahigh temperature environment which occurs during rocket motor firings. Temperature measurement is accomplished by implanting very small temperature sensors composed of graphite encapsulated eutectic and peritectic high melting point compositions into the ablative material in which temperature measurement is desired. The encapsulation of precalibrated mixtures of these compositions into a graphite capsule of such a size that a minimum temperature disturbance is caused in the region of measurement provides a system that is chemically compatible; the sensor material with the container and the container with the ablative material. The microscopic size of the sensor alleviates any temperature distortion due to its presence.

The temperature sensing powdered eutectic melts at a definite and predetermined temperature level which is not subject to alteration. Temperature measurement with the sensors of this invention is not accomplished as a function of time since the sensor only indicates that a specific temperature level has been attained. The duration of the temperature level cannot be obtained. Post test analysis by either metallurgical or X-ray testing methods indicates whether the sensor eutectic material has melted and resolidified within the graphite capsule, thereby establishing that a temperature level has been achieved or exceeded. However, the strategic location of a number of sensors precalibrated to melt at different levels makes it possible to bracket the actual temperature levels achieved, thus providing for a fairly accurate temperature profile.

SUMMARY OF THE INVENTION

The high temperature indicating system of this invention is based on the concept of obtaining internal temperature measurements in ablative type materials by implanting eutectic mixtures of a refractory material and carbon in the ablative material prior to rocket motor testing, and then subjecting the implanted eutectic material to X-ray analysis both before and after firing as a comparison analysis to determine which sensing powders had melted during the rocket motor firing.

The temperature sensors of the invention use either a mixture of two elements or one element and one compound, depending on the two phases in equilibrium which experience eutectic melting at a specific temperature. The eutectic powder is encapsulated in graphite which provides protection from the surrounding environment of the ablative material and thus precludes spurious reactions.

Accordingly, the primary object of this invention is to provide a system for accurately determining temperature measurements in the range of 3500° F. to 6000° F.

Another object of this invention is to provide a system for determining temperature profiles which occur in ablative type reinforced plastic materials subjected to the ultrahigh temperature environment of a rocket motor firing.

A further object of this invention is to provide high temperature sensors composed of precalibrated mixtures of powdered, high temperature melting, refractory metal-carbon eutectic and peritectic compositions encapsulated within a graphite container.

Still further objects and advantages of this invention will become readily apparent upon consideration of the following detailed description thereof taken in conjunction with the drawing which accompanies this application.

DESCRIPTION OF THE PREFERRED EMBODIMENT

Pursuant to the objects of this invention, ultra-high temperatures in the range of 3500° F. to 6000° F. can be measured in an accurate manner by implanting a temperature sensing graphite microcapsule into a material in which the temperature measurement is desired. The graphite microcapsule encapsulates in sealed relationship a precalibrated mixture of a powdered refractory metal-carbon eutectic composition which melts at a predetermined temperature. A number of sensors which melt at different temperature levels can be implanted within an ablative liner material, either randomly or in predetermined fashion, in order to obtain an accurate temperature profile for the material being tested.

Figure 1:
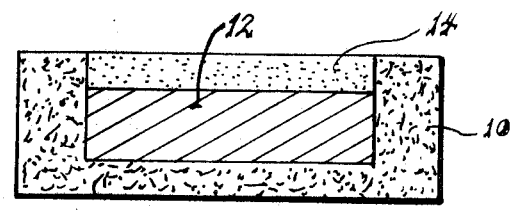
FIG. 1 represents a view in cross section of a graphite encapsulated temperature sensor element of this invention.

Referring now to the figures in the drawing, in all of which like parts are designated by like reference characters, FIG. 1 discloses a temperature sensor element comprising a graphite container 10 encasing in sealed relationship a powdered refractory metal-carbon eutectic composition 12 which functions as a temperature sensing material by melting at a predetermined temperature level depending upon the particular eutectic composition chosen. The graphite container 10 is preferably prepared by machining a very dense, high purity grade, non-porous graphite sheet to the desired dimensions. The graphite possesses a density of 1.88 grams/cc. with total impurities of less than 6 p.p.m. A hole or cavity of appropriate depth is drilled in the center of the machined graphite and a precalibrated mixture of the desired eutectic powder, with a particle size of approximately 325 mesh (44 microns), is hand packed into the cavity of the container 10 and sealed in by a "slip-fit" graphite plug 14.

The primary criteria for selecting the temperature sensing eutectic composition 12 are as follows. First, an irreversible temperature indication that occurs between 3500° F. and 6000° F. Secondly, chemical compatibility with the charred ablative material. Thirdly, ease of fabricability into small sensors that will not affect normal heat flow, and finally, ease of detection of the irreversible temperature indication.

The governing criteria is chemical compatibility. First, the container material 10 must be compatible with the charred ablative material in which the temperature sensor is placed and, secondly, the sensor powder 12 must be compatible with the container material 10. The ablative rocket nozzle liners, in which the sensors will be placed, are composite reinforced plastic structures such as carbon and graphite-reinforced phenolics, asbestos-reinforced phenolics, kraft paper-reinforced phenolics and carbon felt-reinforced phenolics. These composites can be considered as 100% carbon. The only ingredients that are not 100% carbon are the asbestos-reinforced material and the phenolic resins. However, the asbestos melts at <3500° F. and the phenolic resin decomposes at approximately 1000° F., leaving behind a carbon residue. Therefore, the container material 10 must be compatible with carbon. Graphite is the only material which can be unequivocally selected as compatible.

By taking advantage of the formation of metal eutectics with carbon, ideal sensor indicators can be made that are compatible with graphite as the container material 10. The melting of the premixed powders of the eutectic will provide an irreversible indication of temperature. In the temperature range of 3500° F. to 6000° F., eutectic reaction rates are extremely fast and occur at precise temperatures.

The melting point temperature levels of 15 selected binary eutectic compositions that melt between 3000° F. and 6000° F. and are useful with this invention are listed in Table I. Consideration has been given to all refractory metal-carbon eutectics and peritectics that melt between the above temperatures. Where two systems had approximately the same melting temperature preference was given first to the carbon-rich eutectic, then the metal-rich eutectic and last the intermediate eutectics and peritectics. Ternary systems may also be employed provided intermediate reactions do not make it difficult to select a composition that will give a discrete melt temperature.

TABLE I.—TEMPERATURE-SENSING MATERIALS

| Eutectic phases | Composition of eutectic | Melting temperature °C. | °F. |
|---|---|---|---|
| Pt+C | 3 At. Percent C | 1,732±15 | 3,150±27 |
| Zr+ZrC | 5 At. Percent C | 1,835±15 | 3,335±27 |
| Mo+β-Mo₂C | 17 At. Percent C | 2,200±5 | 3,992±9 |
| Nb+βNb₂C | 10.5±0.5 At. Percent C | 2,353±10 | 4,267±18 |
| ZrB₂+C | 33±2 At. Percent C | 2,390±15 | 4,334±27 |
| HfB₂+C | 38±2 At. Percent C | 2,515±10 | 4,559±18 |
| α MoC₁₋ₓ+C | 45 At. Percent C | 2,854±5 | 4,683±9 |
| VC+C | 49.5±0.5 At. Percent C | 2,625±12 | 4,757±22 |
| WC₁₋ₓ°+WC | 41.0 At. Percent C | 2,720±10 | 4,928±18 |
| TiC+C | 63±1 At. Percent C | 2,776±6 | 5,029±11 |
| Ta+βTa₂C | 12±0.5 At. Percent C | 2,843±15 | 5,149±27 |
| ZrC+C | 64.5±1 At. Percent C | 2,911±12 | 5,272±22 |
| HfC+C | 65±1 At. Percent C | 3,180±20 | 5,756±36 |
| NbC+C | 60±1 At. Percent C | 3,305±20 | 5,981±36 |
| TaC+C | 61±0.5 At. Percent C | 3,445±26 | 6,233±47 |

Any or all of the above eutectic compositions may be selected for encapsulation within the graphite container 10 and for implantation in an ablative material to be tested for temperature measurement. All of the powder compositions of Table I have a particle size of approximately 325 mesh with total impurities in the range of from about 100 to 500 p.p.m. These materials are either a mixture of two elements or a mixture of one element and one compound depending on the two phases in equilibrium which experience eutectic melting at a specific temperature level. For example, in the platinum carbide binary system a eutectic exists between platinum and carbon at 3 atomic percent carbon. Therefore, platinum and carbon were used as a starting material for this sensor and an intimate mixture of these powders was made which had a composition of 97 atomic percent platinum and 3 atomic percent carbon. Another example is with the molybdenum-carbide binary system in which a eutectic exists between molybdenum and molybdenum-carbide at 17 atomic percent carbon. Therefore, molybdenum and molybdenum-carbide are used as starting materials for this sensor and an intimate mixture of these powders was made which had a composition of 83 atomic percent molybdenum and 17 atomic percent carbon. The same procedure was followed with the other 13 sensors disclosed in Table I.

Figure 2:
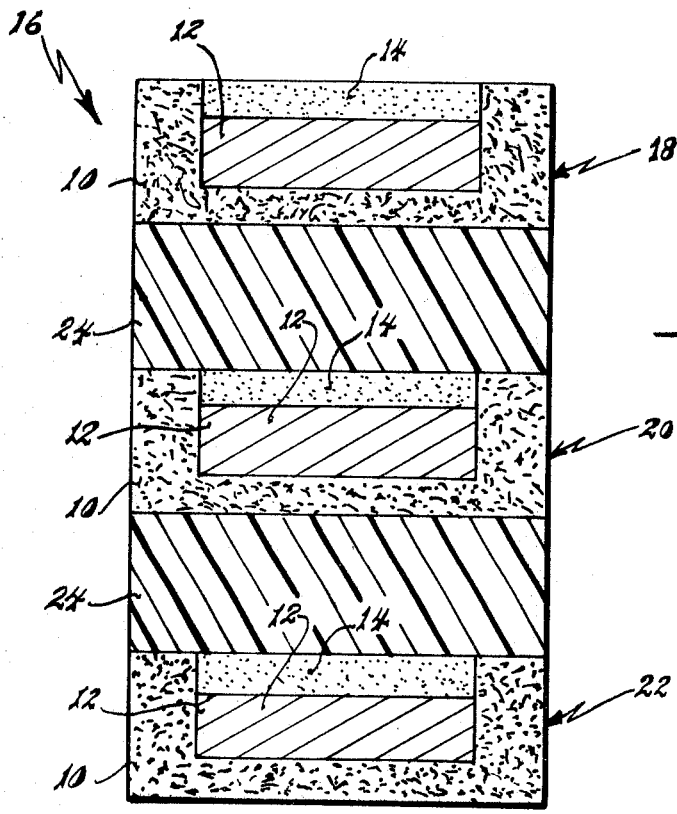
FIG. 2 represents a view in cross section of a temperature sensing plug consisting of three sensor elements stacked in a juxtapositioned relationship to one another.

Referring to FIG. 2 of the drawing, there is disclosed a temperature sensing plug 16 suitable for implanting in an ablative material which is to be tested. The sensing plug 16 consists of three sensors 18, 20 and 22 with individual diameters of about 0.030 inch stacked one above the other at intervals of about 0.030 inch with a total height of about 0.090 inch. A spacer material 24 is machined to a thickness of 0.0250 inch with a diameter of 0.030 inch and positioned between the sensors 18, 20 and 22. The material 24 is a disc of the same ablative phenolic material to be tested and is bonded to the graphite plug material 14 by utilizing a conventional epoxy adhesive. In preparing the individual temperature sensors 18, 20 and 22, a graphite sheet is machined to a thickness of 0.0075 inch and a flat bottom hole with an inside diameter of 0.020 inch is then drilled into the sheet to produce a cavity for the sensor material. The sensor material is then hand packed into the cavity of the graphite container. Next, the laminated graphite cap-phenolic spacer formed by bonding plug 14 to spacer 24 is placed on top of the loaded capsule and bonded into place using an epoxy adhesive. This procedure is repeated for the next two sensors which are then bonded together to form the plug assembly 16. The sensing plug 16 is now suitable for implantation into an ablative liner material.

Figure 3:
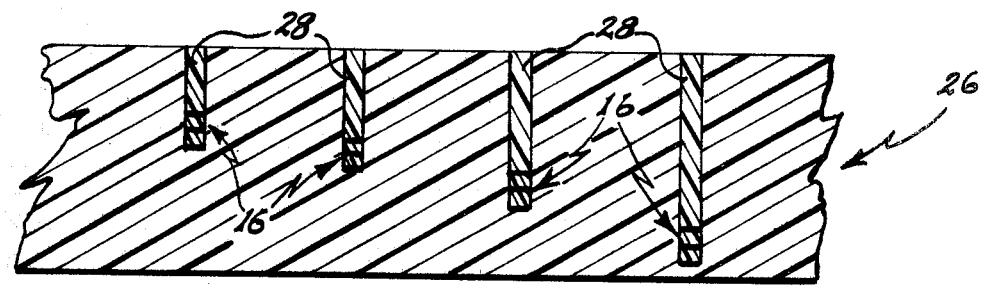
FIG. 3 represents a view in cross section illustrating a number of temperature sensing plugs of the type disclosed in FIG. 2 implanted in a reinformed plastic ablative type material.

FIG. 3 discloses a series of temperature sensing plug assemblies of the type illustrated in FIG. 2 implanted into an ablative liner 26 for the purpose of ascertaining a temperature profile for the ablative material. A number of holes are drilled into the material 26 and a sensor plug 16 is inserted therein. A long phenolic plug 28 is placed in the hole on top of the sensor plug 16 and sealed using a conventional epoxy resin.

In order to establish a temperature profile for the ablative liner 26 an X-ray analysis of the temperature sensors is conducted both before and after the ablative material is subjected to the ultrahigh temperatures encountered during a rocket motor firing. Because the temperature profiles throughout the ablative material is the criterion used for evolution, an inert plasma gas is utilized during X-ray analysis so that surface material loss during tests is minimal.

X-rays of the plasma arc plugs taken before and after firing are compared to determine which sensing powders had melted during testing. When melting of the sensor powders occurs, the melt will wet the inside of the graphite microcapsule and consequently react with it and erode the inside of the hole in the graphite container, i.e., the melt will take more carbon into solution and hence increase the volume of the hole, which encapsulated the sensor material. When comparing the X-rays of a sensor before and after melting, the X-ray of the melted sensor exhibits a swollen appearance because of the carbon pickup from the graphite surrounding the hole.

The X-rays of the sensors which did not melt exhibited very little change in the shape of the hole. The only change in shape which could be noted was due to the densification of the sensor powder, i.e., there was a slight decrease in the size of the powder compact. Also, for the sensors which did not melt during testing, there was no indication of any solid state reaction between the sensing powders and graphite microcapsules. For those sensors which are questionable as to whether they melt or not, the plasma arc plugs can be cut apart and the sensors viewed under a microscope to determine their condition.

The present invention makes it feasible to measure accurately those temperature levels in the range of 3500° F. to 6000° F. which occur in ablating material subjected to the high temperature of a rocket motor firing. The microscopic size of the sensors alleviates temperature distortion due to their presence and the sensing material melts at definite and predetermined temperature levels which are not subject to alteration.

The successful development of the system of this invention provides for an extension of the temperature measurement range above 4200° F. and enables the accurate determination of char surface temperature for ablative typed materials. Such information is needed in order to better predict surface regression rates and the thermal insulation capabilities of such materials thereby contributing successfully to the overall attempts to improve the operational functions of advanced re-entry vehicles.

Although the invention has been described with reference to particular embodiments, it will be understood by those skilled in the art that the invention is capable of a variety of alternative embodiments.

I claim:

1. A temperature indicating sensor comprising a container having a eutectic composition therewithin, said composition comprising a refractory metal-carbon binary alloy characterized by a predetermined melting point temperature within the range of from about 3500° F. to 6000° F.

References Cited
UNITED STATES PATENTS

| | | | |
|---|---|---|---|
| 688,562 | 12/1901 | Watkin | 73—358 |
| 2,359,794 | 10/1944 | Rogers | 73—358 |
| 2,805,575 | 9/1957 | Fredericks | 73—358 |

S. CLEMENT SWISHER, Primary Examiner

F. SHOON, Assistant Examiner

U.S. Cl. X.R.

116—114.5